(12) United States Patent
Horiguchi et al.

(10) Patent No.: US 6,485,811 B1
(45) Date of Patent: *Nov. 26, 2002

(54) NONWOVEN FABRIC FOR PLEATED FILTERS, AND A PRODUCTION PROCESS THEREFOR

(75) Inventors: Hiroyoshi Horiguchi; Makoto Nishimura; Kaori Iwasaki, all of Shiga (JP)

(73) Assignee: Toray Industries, Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,784

(22) PCT Filed: Mar. 29, 1996

(86) PCT No.: PCT/JP96/00863

§ 371 (c)(1), (2), (4) Date: Nov. 25, 1997

(87) PCT Pub. No.: WO97/37071

PCT Pub. Date: Oct. 9, 1997

(51) Int. Cl.⁷ .............................. B32B 3/28; B32B 3/30
(52) U.S. Cl. .................... 428/181; 428/175; 428/196; 428/197; 428/198; 442/365; 442/417; 210/493.1; 210/499; 210/507; 55/527
(58) Field of Search ............................. 442/364, 110, 442/111, 395, 365, 417; 428/175, 181, 196, 197, 198; 210/493.1, 499, 507; 55/527

(56) References Cited

U.S. PATENT DOCUMENTS 4,309,479 A * 1/1982 Naruse et al. .............. 428/408
6,090,469 A * 4/2000 Wadsworth et al. ........ 428/181

FOREIGN PATENT DOCUMENTS

| JP | 62-155912 | * | 7/1987 |
| JP | 01-034403 | * | 2/1989 |
| JP | 02-264018 | * | 10/1990 |
| JP | 03-8856 | * | 1/1991 |
| JP | 03-146757 | * | 6/1991 |

OTHER PUBLICATIONS

Tanaka, Minoru, "Application of ET spun–bonded nonwoven fabric to the filter material", Japan Nonvowens Report, No. 240, Jul. 10, 1993, pp. 11–12.

"A special edition –Technique and development of goods", Japan Nonwovens Report, No. 244, Nov. 10, 1993, pp. 20–21.

"Japan Nonwovens Horizons 1993", Japan Nonwovens Report, published Oct. 20, 1992, pp. 79–80.

* cited by examiner

Primary Examiner—Terrel Morris
Assistant Examiner—John J. Guarriello
(74) Attorney, Agent, or Firm—Schnader Harrison Segal & Lewis LLP (57) ABSTRACT

Nonwoven fabric for pleated filters comprising a sheath-core conjugate filament in which the core component is made of a polymer higher in melting point and the sheath component is made of a polymer lower in melting point, having compressively bonded portions dotted by embossing, with a weight per unit area X (g/m²) of the nonwoven fabric and a stiffness Y (mgf) obtained according to the Gurley method of JIS L 1096 of $Y/X^2 \geq 0.03$ and $X \geq 120$.

11 Claims, 1 Drawing Sheet

NONWOVEN FABRIC FOR PLEATED FILTERS, AND A PRODUCTION PROCESS THEREFOR

The present invention relates to a nonwoven fabric for pleated filters, partially compressively bonded by embossing and having high weight per unit area, and relates to a production process therefor.

BACKGROUND ART

It is generally known that a nonwoven fabric composed of continuous filaments can be produced by drawing the continuous filaments spun from a spinneret by an air sucker, etc. at a high speed, letting them collide with a divergence plate mainly made of a lead, to be electrified and opened, catching them on a net conveyer, and partially thermally compressively bonding them by a pair of heated embossing rolls, to form a nonwoven fabric, or by mechanically entangling the web piled and caught on a net, by needle punching, to form a nonwoven fabric. Such nonwoven fabrics are widely used as industrial materials, geotextiles, etc.

Especially for filters, since the nonwoven fabrics have high performance and are excellent in durability and workability, they are expected to be in great demand as a substitute for the conventional filter paper. For filters, since any partial defect greatly affects the performance of filters, the nonwoven fabric used for them are required to have high quality, being less uneven in weight per unit area and free from partial delamination in the sheet.

Japanese Patent Publication (Kokoku) No. 60-4298 discloses a nonwoven fabric producing process, in which a web composed of continuous filaments of two or more kinds having different melting points is thermally compressively bonded, to melt the filaments of lower melting point, for production of a nonwoven fabric.

However, the nonwoven fabric is insufficient in thermally compressively bonding in the thickness direction even if thermally compressively bonding is effected by a pair of embossing rolls, and delamination is liable to occur at the center of the thickness. Furthermore, since the thermally compressively bonding must be effected at a temperature higher than the melting point of the filaments that have lower melting point, the filaments lower in melting point are liable to adhere to the surfaces of the embossing rolls, and this contamination causes the embossed sheet to be attracted by the rolls, partially delaminating the surfaces of the nonwoven fabric disadvantageously. Therefore, if the nonwoven fabric is later pleated for use as a filter, it cannot be well pleated, and at the partially delaminated portions, fine particles leak. Furthermore, on the partially delaminated surface, a nap is raised, making it difficult to allow dust to be released, lowering the filter performance. Because of these problems, the nonwoven fabric is insufficient as a filter medium.

Japanese Laid-open Patent Application (Kokai) Nos. 2-133644, 2-169756 and 3-8856 disclose nonwoven fabrics composed of sheath-core conjugate filaments respectively consisting of a polymer higher in melting point used as the core component and a polymer lower in melting point used as the sheath component.

The nonwoven fabric disclosed in Japanese Laid-open Patent Application (Kokai) No. 2-133644 has the web thermally compressively bonded on the entire surface, and has smoothness and performance like a film. The weight per unit area specified here is 40 g/m² at the highest.

Japanese Laid-open Patent Application (Kokai) No. 2-169756 intends to provide a nonwoven fabric having non-melting-bonded portions kept bulky to give a soft fabric feeling, for providing excellent surface abrasion resistance and strength. The weight per unit area specified here is 40 g/m² at the highest.

Japanese Laid-open Patent Application (Kokai) No. 3-8856 discloses a nonwoven fabric used as a mat in asphalt road construction, waterproof material and soundproof material. The weight per unit area specified here is 100 g/m² at the highest.

On the other hand, nonwoven fabrics exceeding 100 g/m² in weight per unit area are disclosed in Japanese Laid-open Patent Application (Kokai) Nos. 3-137261 and 3-146757, but they are impregnated with asphalt or acrylic resin, to be used for roofing.

The object of the present invention is to provide a filter medium having excellent pleatability, freedom from sheet delamination, and high collection efficiency.

An embodiment of the present invention is a nonwoven fabric for pleated filters comprising sheath-core conjugate filaments in which the core component is made of a polymer higher in melting point and the sheath component is made of a polymer lower in melting point, wherein the surfaces of the nonwoven fabric have a plurality of compressively bonded portions dotted by embossing, and the weight per unit area X (g/m²) of the nonwoven fabric obtained according to the method of JIS L1906 and the stiffness Y (mgf) obtained according to the Gurley method of JIS L 1096 6.20.1 Method A satisfy the following formulae:

$Y/X^2 \geq 0.03$ $X \geq 120.$

Another embodiment of the present invention is a filter element which uses said nonwoven fabric for pleated filters, as a filter medium.

The present invention can provide an excellent high performance nonwoven fabric for pleated filters, free from delamination, moderate in stiffness, and good in pleatability and dimensional stability.

An embodiment of the production process of the present invention is a process for producing a nonwoven fabric for pleated filters, comprising the steps of sucking and drawing continuous filaments spun from a sheath-core conjugate spinneret, opening them, piling them on a traveling net, to form a continuous filament web, preliminarily compressively bonding the web by a pair of heated flat rolls, and then partially thermally compressively bonding it by a pair of embossing rolls, to form a nonwoven fabric of 120 g/m² or more in weight per unit area.

According to the production process of this embodiment, a high performance nonwoven fabric for pleated filters can be produced in one series of steps.

Best Mode for Carrying out the Invention

One embodiment of the present invention is a nonwoven fabric for pleated filters, in which the weight per unit area x (g/m²) is 120 or more and the weight per unit area X and stiffness Y (mgf) satisfy the following formulae.

$$Y/X^2 \geq 0.03$$

$$X \geq 120$$

The stiffness referred to in this specification is measured according to the Gurley method of JIS L 1096 6.20.1 Method A, using a sample of 1 inch in the transverse direction and 1.5 inches in the machine direction.

In the nonwoven fabric of the present invention, it is important that the value of $Y/X^2$ is 0.03 or more. If the value of $Y/X^2$ is less than 0.03, the nonwoven fabric is insufficient in stiffness, hence not being sharp or uniform in the folds of the pleats and poor in pleatability, and it becomes also difficult to install the pleated nonwoven fabric into the filter unit. The value of $Y/X^2$ is preferably 0.036 or more.

The nonwoven fabric comprises sheath-core conjugate filaments comprising two components; a polymer higher in melting point and a polymer lower in melting point.

In the case of a conventional nonwoven fabric composed of a mixed filament which has one filament component higher in melting point and another filament component lower in melting point, even if the temperature and pressure of the embossing rolls are raised, the relation between the weight per unit area (X) and stiffness (Y) of the nonwoven fabric cannot satisfy $Y/X^2 \geq 0.03$. As a result, the bonding strength becomes insufficient, causing delamination, thus lowering the filter performance, pleatability, etc. If the nonwoven fabric is impregnated with a resin such as an acrylic resin to compensate for the low bonding strength of filaments, the porosity of the filaments constituting the nonwoven fabric is decreased, significantly increasing the initial pressure drop of the filter disadvantageously.

The structure of the sheath-core conjugate filament is most preferably concentric, but can also be eccentric or odd-shape type. It also can be concentric triple or more multiple circles with an intermediate layer or layers provided between the core and the sheath.

The polymer higher in melting point and the polymer lower in melting point used for the filaments include polyesters, nylon, polypropylene, their copolymers, and these polymers containing any other polymer and additives.

As the polymer used as the core component, polyethylene terephthalate is preferable in view of the strength and heat resistance of the nonwoven fabric. As the polymer lower in melting point used as the sheath component, a copolymerized polyester with a melting point lower than that of the core component by 20° C. or more is preferable to provide adhesive strength.

The sheath component preferably accounts for 5 to 40 wt % of the sheath-core continuous filament, to provide sufficient covering of the core component and stiffness.

If antistatic property is required, it is preferable that the core component contains electrically conductive particles. The material of the conductive particles can be selected from carbon black, metal compounds, metal oxides, etc. To provide of fiber formability, carbon black is preferable. In this case, the frictionally electrified quantity of the nonwoven fabric measured according to the method C of JIS L 1094 is preferably less than 10 $\mu C/m^2$, more preferably less than 5 $\mu C/m^2$. The conductive particle content is preferably 2 wt % or more based on the weight of the filament in view of pleatability and higher antistatic property.

The surfaces of the nonwoven fabric of the present invention have a plurality of compressively bonded portions. The compressively bonded portions are formed as dents by embossing the surfaces of the nonwoven fabric. At the compressively bonded portions, filaments constituting the nonwoven fabric are melting-bonded by heat and pressure. In other words, dotted portions in which filaments are melt-bonded and densely gathered together in comparison with the other portions exist on the surfaces of the nonwoven fabric.

In order to form compressively bonded portions dotted on the surfaces of a nonwoven fabric, usually a pair of heated embossing rolls are used. In the present invention, the style, combination, etc. of the embossing rolls are not especially limited. However, it is preferable that the engraved depth of the embossing rolls is about 0.5 to 1 mm, to achieve $Y/X^2 \geq 0.03$ in the relation between the weight per unit area X and stiffness Y of the nonwoven fabric, and to form dents with an average depth of 60 $\mu m$ or less.

The average depth of dents is 60 $\mu m$ or less as the average roughness (Ra) obtained according to JIS B 0601. For example, a surface roughness tester, SE-40C (in conformity with JIS B 0651 "Instruments for Measurement of Surface Roughness by the Stylus Method") produced by K.K. Kosaka Kenkyujo generally used for measuring the surface roughnesses of metals, etc. can be used.

When the average depth of the dents is 60 $\mu m$ or less, the nap of the filter medium can be considerably inhibited in comparison with conventional nonwoven fabrics. If the average depth of dents exceeds 60 $\mu m$, the nap of the nonwoven fabric grows like a geometric series, making the nonwoven fabric unsuitable as a filter medium. If the average depth of dents is small, the surface roughness of the nonwoven fabric is small, and the abrasion resistance between dust or the filter support such as a wire gauze and the filter medium can be significantly decreased. Therefore, the nap of the filter medium can be inhibited, and the dust entangled with the nap can be decreased to improve the dust removal ability after pulse jetting, hence extending the bag life.

The percentage of the compressively bonded portions in the entire area of the nonwoven fabric is preferably smaller, though not especially limited, say, preferably 5 to 35%, more preferably 10 to 30%. To specify the quantity, if the area of each compressively bonded portion is 0.5 to 1.5 $mm^2$, the number of the compressively bonded portions existing on the surfaces of the nonwoven fabric is preferably 10 to 50 per square centimeter, more preferably 25 to 35 per square centimeter. The form of the dents is not especially limited, but any form which can be dotted such as rectangle, parallelogram, circle, or ellipse, etc. is preferable.

The compressively bonded portions referred in this specification mean the portions in which the fibers are compressively bonded and densely gathered together by the protrusions of the embossing rolls. For example, when a pair of a top roll and a bottom roll respectively with a plurality of straight grooves formed parallel to each other on the surfaces, with the grooves of the top roll and the grooves of the bottom roll crossed at a certain angle, are used as the embossing rolls, the compressively bonded portions mean the portions in which the fibers of the nonwoven fabric are compressively bonded and densely gathered together between the protrusions of the top roll and the protrusions of the bottom roll. In this case, the portions pressed between the cavities of the top roll and the protrusions of the bottom roll, and between the protrusions of the top roll and the cavities of the bottom roll are not called the compressively bonded portions. When the top or bottom roll only has a predetermined pattern of cavities and protrusions while the other roll is flat without any cavities or protrusions, the compressively bonding portions mean the portions in which the fibers of the nonwoven fabric are compressively bonded and densely gathered together between the protrusions of the roll with protrusions and cavities and the flat roll.

The apparent density of the compressively bonded portions is preferably 0.6 g/cm$^3$ or more to provide better bonding. The apparent density of the non-compressively bonding portions is preferably less than 0.6 g/cm$^3$ to let the filaments exist independently for preventing the nonwoven fabric from being formed like a film and for achieving the intended filter performance.

The nonwoven fabric for pleated filters of the present invention is characteristically excellent in pleatability and dimensional stability while the high filter performance is kept, even though the nonwoven fabric is as high as 120 g/m$^2$ or more in weight per unit area, and such excellent features could not be obtained with the conventional nonwoven fabrics. Furthermore, the effect of the present invention can be exhibited even if the weight per unit area is 150 g/m$^2$ or more, or 200 g/m$^2$ or more. The effect of the present invention can be remarkably exhibited rather when the nonwoven fabric is as high as 200 g/m$^2$ in weight per unit area, since the conventional nonwoven fabrics are generally poor in pleatability and dimensional stability when they are high in weight per unit area.

When the nonwoven fabric for pleated filters of the present invention is used as a filter medium, a high performance filter element can be provided.

The nonwoven fabric for pleated filters of the present invention can be obtained by sucking and drawing the continuous filaments spun from a sheath-core conjugate spinneret, by such a means as an air sucker, opening the filaments, piling them onto a traveling net, to form a continuous filament web, and thermally compressively bonding the web.

The thermally compressive bonding can be achieved by partially compressively bonding by a pair of heated embossing rolls, especially preferably by preliminarily compressively bonding by a pair of flat rolls, to enhance the apparent density of the web, and then embossing by a pair of embossing rolls.

In the thermally compressive bonding, it is preferable to set the rolls at a temperature lower than the melting point of the component that has lower melting point, by 10° C. or more, to prevent the contamination of the rolls.

EXAMPLES

The present invention is described below in more detail in reference to examples. The properties in the examples were measured according to the following methods.

Thickness of Nonwoven Fabric

Measured according to the thickness measuring method specified in JIS L 1906.

Weight Per Unit Area (g/m$^2$)

Measured according to the method for measuring the weight per unit area specified in JIS L 1906 part 4.2 as follows:

(1) Take three test specimens of the same size, more than 500 square centimeters* per meter in width.

*Note: the shape of the specimen is either a circle or a rectangle (ex. 25×20 cm).

(2) Measure the weight of the test specimens in the normal state.

(3) Obtain the weight per unit are by the formula below, and express it to three significant figures according to the method of JIS Z 8401.

The following formula means "the weight per unit area in grams per square meter equals the average weight of the test specimen in grams divided by the area of the test specimen in square meters":

$$m_s = \bar{m}/S$$

where, $m_s$=the weight per unit area (g/m$_2$)

$\bar{m}$=the average weight of test specimen (g)

S=area of test specimen (m$^2$).

Stiffness

Figure 1:
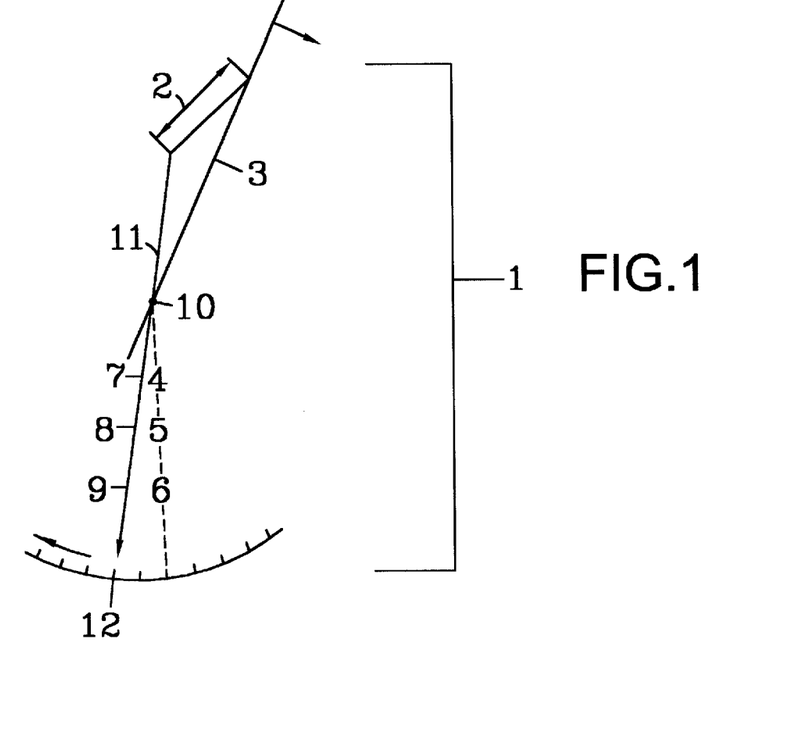
FIG. 1 illustrates the principal parts of a Gurley type tester of JIS L1096 6.20.1 Method A (Gurley Method) used to measure fabric stiffness.

A sample of 1 inch in the transverse direction and 1.5 inches in the machine direction was taken and measured according to the Gurley method specified in JIS L 1096. According to that method, a fabric specimen 2, measuring L cm in length and d cm in width, in warp and weft directions, is tested using a Gurley type tester 1 as shown in FIG. 1. A specimen 2 is mounted to the tester 1 at the movable arm 3, and the tester 1 is adjusted to the scale L/2.54 on the arm 3. Next, suitable weights 4, 5, and 6, each having respective masses of Wa (g), Wb (g), and Wc (g), are mounted to the respective weight setting holes 7, 8, and 9, which are located at respective distances a (cm), b (cm), and c (cm) below the fulcrum 10 of the pendulum 11, and the movable arm 3 is rotated at a fixed rate. A scale reading 12 of value RG is taken when the specimen 2 parts from the pendulum 11. The fabric stiffness is determined according to the following formula:

$$\text{Stiffness (mgf)} = RG \times (aW_a + bW_b + cW_c) \times (L^2/d) \times 0.306.$$

Average Depth of Dents

Figure 2:
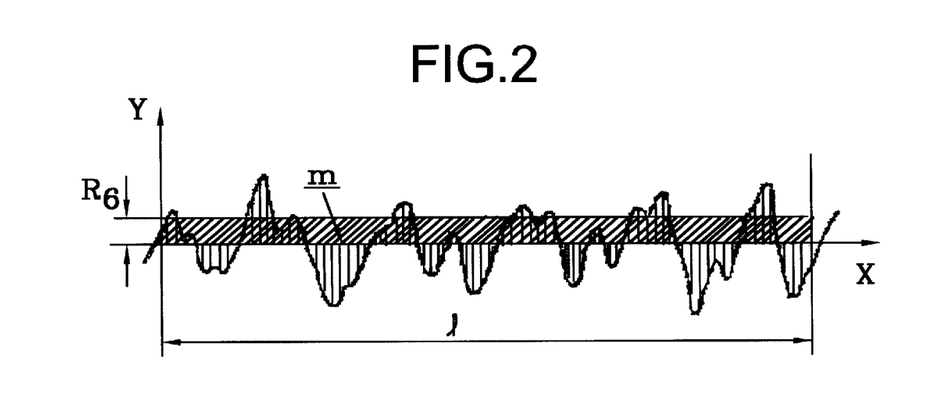
FIG. 2 illustrates a roughness curve $y=f(x)$ for determining surface roughness according to the method of JIS B 0601 3.1.1.

The average depth of dents is the arithmetic average roughness (Ra) obtained according to JIS B 0601 "Surface Roughness", using a surface roughness tester (Model SE-40C produced by K.K. Kosaka Kenkyujo in conformity with JIS B 0651 "Instruments for Measurement of Surface Roughness by the Stylus Method"). According to JIS B 0601 3.1.1 Determination of Ra, the surface roughness Ra is defined according to the following formula:

$$Ra(\mu m) = \frac{1}{l} \int_o^l |f(x)| dx$$

where, l=reference length, when sampling only the reference length from the roughness curve in the direction of the mean line as shown in FIG. 2 expressed by y=f(x), taking the x-axis in the direction of the mean line and the y-axis in the direction of longitudinal magnification of the sample curve. The arithmetic average roughness was obtained with a cutoff value of 2.5 mm for a length of 8 mm.

Sheet Delamination

Samples of 20 cm in the transverse direction and 80 cm in the machine direction were taken generally in the machine direction, and bent respectively to form a circular arc of 10 cm in diameter, and the delamination was evaluated according to the following criteria:

Criteria o: No delamination was observed at all.

Δ: One sample showed delamination of less than 2 cm.

x: Two or more samples showed delamination.

Pleatability

A sheet of 50 cm in width and 300 m in length was pleated at 3 cm intervals by a rotary pleating machine, and the pleatability was evaluated according to the following criteria:

Criteria o: The folds of pleats were sharp and uniform, and the sheet did not meander.

Δ: The folds of pleats were rather uneven and the sheet slightly meandered, but not to such degrees as to be detrimental to practical use.

x: The folds of pleats were uneven and the sheet meandered, to such degrees as to inconvenience the installation into the filter unit.

Apparent Density of Compressively Bonded Portions (g/cm³)

A section of a compressively bonded portion was photographed hundred-fold using a scanning electron microscope, and the dimensions were measured using vernier calipers. From the magnification, the thickness was calculated, and the apparent density of the compressively bonded portion was calculated from the following formula:

Apparent density of an compressively bonded portion= Weight per unit area/Thickness of the compressively bonding portion

Apparent Density of Non-compressively Bonded Portions (g/cm³)

The thickness of a non-compressively bonded portion was evaluated according to JIS L 1906, and the apparent density of the non-compressively bonded portion was calculated from the following formula:

Apparent density of a non-compressively bonded portion=Weight per unit area/Thickness of the non-compressively bonded portion

Filter Performance

Evaluation of Nap

Evaluated according to the Taber method specified in JIS L 1906 "Abrasion Test".

Collection Efficiency

A sample disc of 170 mm in diameter was installed in a duct equipped with a blower, and the air in a laboratory was sucked at an air velocity of 3 m/min by the blower. The atmospheric dust in the laboratory was referred to for evaluation.

The number of particles (0.5 μm to 1 μm) in the atmospheric dust of the laboratory was counted by a particle counter (KC01B produced by Rion K.K.) (this is expressed by "a" in the following formula). The number of particles (0.5 μm to 1 μm) of the air in the duct which passed the nonwoven fabric was counted by said particle counter (this is expressed by "b" in the following formula). The collection efficiency was obtained from the following formula:

Collection efficiency (%)=100×(a−b)/a.

Example 1 and Comparative Example 1

Polyethylene terephthalate of 0.66 in intrinsic viscosity and 262° C. in melting point, and isophthalic acid-copolymerized polyester mainly composed of ethylene terephthalate of 0.68 in intrinsic viscosity and 228° C. in melting point were molten by respectively different extruders, and spun from a sheath-core spinnable spinneret, with the throughput adjusted to be the filament fineness of 2 deniers and to be the rate of the component lower in melting point of 15 wt % based on the weight of all the fibers. In succession, the spun filaments were drawn at a high speed of about 5000 m/min by an air sucker, collided with a divergence plate mainly made of a lead, to be opened, and jetted and caught on a traveling net conveyer, to form a nonwoven fabric web. In this case, the speed of the net conveyer was changed to obtain nonwoven fabrics of 120 g/m² (0.40 mm thick), 200 g/m² (0.55 mm thick), 260 g/m² (0.61 mm thick), and 360 g/m² (0.75 mm thick) respectively in weight per unit area. Each of the nonwoven fabrics was preliminarily compressively bonded by flat rolls of 130° C. in temperature and 50 kg/cm in pressure, and then thermally compressively bonded by a pair of a top embossing roll and a bottom embossing roll respectively with a plurality of straight grooves (0.8 mm in engraved depth) formed in parallel to each other on the surface, at a temperature of 220° C. with the bonding pressure of the embossing rolls changed as shown in Table 1. The compressively bonded portions were parallelograms of 0.6 mm in area, and the number of compressively bonded portions was 25 per square centimeter. The total area of the compressively bonding portions accounted for 15%. In succession, the embossed sheet was cut to be 50 cm in width, and pleated by a rotary pleating machine. The results are shown in Table 1.

As can be seen from Table 1, the nonwoven fabrics of Example 1 did not cause sheet delamination and were good in pleatability, dimensional stability, etc., being satisfactory as filter media. Furthermore, since the values of $Y/X^2$ are generally 0.036 or more, it can be seen that the nonwoven fabrics are stable in delamination resistance and pleatability.

Example 2

Thermally compressively bonding was effected as done in Example 1, except that the nonwoven fabric was 220 g/m² in weight per unit area, that the bonding pressure was 60 kg/cm, and that the embossing rolls used was 5% (Example 2-(1)), 10% (Example 2-(2)), 15% (Example 2-(3)), 20% (Example 2-(4)), 30% (Example 2-(5)), or 40% (Example 2-(6)) in the total area of compressively bonded portions.

The stiffness values of Example 2-(1)~(6) were respectively 1580 mg, 2030 mg, 2010 mg, 1780 mg, 1630 mg, and 1490 mg, and the values of $Y/X^2$ were 0.033, 0.041, 0.041, 0.037, 0.033, and 0.031.

The nonwoven fabrics were cut to 50 cm in width, and pleated by a rotary pleating machine.

The pleated filters obtained from the nonwoven fabrics of 5 to 30% in the total area of compressively bonding portions in Example 2-(1)~(5) were as good as Grade 4 or higher in the evaluation of nap, and excellent in delamination resistance and pleatability. The nonwoven fabric of 40% in the total area of compressively bonding portions in Example 2-(6) was Grade 4 or higher in the evaluation of nap and excellent in delamination resistance, but rather uneven in the folds of pleats and slightly meandering, even though there was no problem in practical use.

Example 3

Nonwoven fabrics of 200 g/m² in weight per unit area were produced as described for Example 1, except that the fiber fineness of filaments was 2 deniers and that the rate of the component lower in melting point in the total weight of all the fibers was 30 wt % (Example 3-(1)), 20 wt % (Example 3-(2)), 10 wt % (Example 3-(3)), or 5 wt % (Example 3-(4)). In succession, they were thermally compressively bonded as described for Example 1, except that the temperature of the embossing rolls was 200° C. and that the bonding pressure was 60 kg/cm.

The stiffness values of Example 3-(1)~(4) were respectively 1380 mg, 1620 mg, 1410 mg, and 1250 mg, and the values of $Y/X^2$ were 0.035, 0.040, 0.035, and 0.031.

The nonwoven fabrics were in succession cut to 50 cm in width, and pleated by a rotary pleating machine.

The pleated nonwoven fabrics were good as pleated filters without causing delamination.

Comparative Example 2

Polyethylene terephthalate of 0.66 in intrinsic viscosity and 262° C. in melting point and isophthalic acid-copolymerized polyester mainly composed of ethylene terephthalate of 0.68 in intrinsic viscosity and 228° C. in melting point were melt-spun respectively separately at a ratio of 80:20, drawn at a high speed of about 5000 m/min by an air sucker, collided with a divergence plate mainly made of a lead, to be opened, and jetted and caught on a traveling net conveyer, to form a nonwoven fabric web composed of mixed filaments.

Then, the web was preliminarily compressively bonded by flat rolls at 130° C. in temperature and 50 kg/cm in pressure, and thermally compressively bonded using the same embossing rolls as used in Example 1 at a bonding pressure of 60 kg/cm at a temperature of 220° C. (Comparative Example 2-(1)) or 240° C. (Comparative Example 2-(2)), to obtain two nonwoven fabrics of 260 g/m² in weight per unit area different in thermal embossing temperature.

The nonwoven fabric obtained at an embossing temperature of 220° C. (Comparative Example 2-(1)) was insufficient in thermally compressively bonding strength, and delamination occurred at the center of the thickness.

In the nonwoven fabric obtained at an embossing temperature of 240° C. (Comparative Example 2-(2)), sheet surface delamination due to contamination on the surfaces of embossing rolls occurred, and the nap was evaluated as Grade 2. So, the nonwoven fabric was unsuitable as pleated filters.

Example 4

Polyethylene terephthalate of 260° C. in melting point containing carbon black as electrically conductive particles by 2 wt % (Example 4-(1)), 3 wt % (Example 4-(2)), or 4 wt % (Example 4-(3)) based on the weight of the conjugate filaments of sheath-core structure was used as the core component, and isophthalic acid-copolymerized polyester mainly composed of ethylene terephthalate of 230° C. in melting point was used as the sheath component. Sheath-core conjugate filaments consisting of the core component and the sheath component at a ratio by weight of 85:15 were melt-spun to be 2 deniers in fiber fineness, drawn at a high speed of about 4000 m/min by an air sucker, opened by air pressure, and piled on a traveling net. The web was thermally compressively bonded as described for Example 1, except that the temperature of the embossing rolls was 200° C. and that the bonding pressure was 60 kg/cm, to obtain a nonwoven fabric of 200 g/m² in weight per unit area and 0.54 mm in thickness.

The nonwoven fabrics of Example 4-(1), 4-(2) and 4-(3) were respectively 7 $\mu C/m^2$, 6 $\mu C/m^2$ and 4 $\mu C/m^2$ in frictionally electrified quantity, 2500 mg, 2700 mg and 2900 mg in stiffness, and 0.063, 0.068 and 0.073 in $Y/X^2$. They were also good in filter performance, and had stiffness enough to withstand pleating.

Industrial Applicability

The present invention can provide an excellent high performance nonwoven fabric for pleated filters free from delamination, moderate in stiffness, and good in pleatability and dimensional stability.

Furthermore, the present invention can provide a high performance filter element using said nonwoven fabric for pleated filters.

TABLE 1

| | Bonding pressure (kg/cm) | Weight per unit area (g/m²) | Stiffness (mg) | $Y/X^2$ | Average depth of dents (µm) | Sheet delamination | Pleatability |
|---|---|---|---|---|---|---|---|
| Comparative example 1-(1) | 40 | 120 | 400 | 0.027 | 33 | ○ | × |
| Example | | | | | | | |
| 1-(1) | 50 | | 480 | 0.033 | 35 | ○ | Δ |
| 1-(2) | 60 | | 530 | 0.037 | 37 | ○ | ○ |
| 1-(3) | 70 | | 560 | 0.039 | 40 | ○ | ○ |
| Comparative example 1-(2) | 40 | 200 | 1130 | 0.028 | 34 | × | × |
| Example | | | | | | | |
| 1-(4) | 50 | | 1250 | 0.031 | 39 | Δ | Δ |
| 1-(5) | 60 | | 1580 | 0.040 | 43 | ○ | ○ |
| 1-(6) | 70 | | 1750 | 0.044 | 45 | ○ | ○ |
| Comparative example 1-(3) | 40 | 260 | 1920 | 0.028 | 35 | × | Δ |
| Example | | | | | | | |
| 1-(7) | 50 | | 2390 | 0.035 | 40 | Δ | Δ |
| 1-(8) | 60 | | 2530 | 0.037 | 48 | ○ | ○ |
| 1-(9) | 70 | | 2850 | 0.042 | 58 | ○ | ○ |

TABLE 1-continued

| | | | | | | | |
|---|---|---|---|---|---|---|---|
| Comparative example 1-(4) | 40 | 360 | 3600 | 0.028 | 50 | × | Δ |
| Example | | | | | | | |
| 1-(10) | 50 | | 4180 | 0.032 | 53 | Δ | Δ |
| 1-(11) | 60 | | 4620 | 0.036 | 55 | ○ | ○ |
| 1-(12) | 70 | | 4950 | 0.038 | 65 | ○ | ○ |

| | Apparent density of compressively bonding portions (g/cm$^3$) | Apparent density of non-compressively bonding portions (g/cm$^3$) | Filter performance | | |
|---|---|---|---|---|---|
| | | | Nap (Grade) | Collection efficiency (%) | Pressure drop (mmAq) |
| Comparative example 1-(1) | 0.46 | 0.3 | 3 | 21 | 1.7 |
| Example | | | | | |
| 1-(1) | 0.62 | 0.3 | 4 | 23 | 1.7 |
| 1-(2) | 0.71 | 0.3 | 5 | 24 | 1.7 |
| 1-(3) | 0.9 | 0.3 | 5 | 24 | 1.8 |
| Comparative example 1-(2) | 0.52 | 0.36 | 3 | 45 | 2.7 |
| Example | | | | | |
| 1-(4) | 0.61 | 0.36 | 4 | 47 | 3.0 |
| 1-(5) | 0.7 | 0.36 | 5 | 49 | 3.2 |
| 1-(6) | 1.1 | 0.36 | 5 | 52 | 3.4 |
| Comparative example 1-(3) | 0.59 | 0.43 | 3 | 51 | 3.9 |
| Example | | | | | |
| 1-(7) | 0.76 | 0.43 | 4 | 56 | 4.0 |
| 1-(8) | 0.91 | 0.43 | 5 | 52 | 4.2 |
| 1-(9) | 1.22 | 0.43 | 4 | 55 | 4.4 |
| Comparative example 1-(4) | 0.66 | 0.48 | 3 | 45 | 7.0 |
| Example | | | | | |
| 1-(10) | 0.87 | 0.48 | 4 | 55 | 7.5 |
| 1-(11) | 1.0 | 0.48 | 5 | 60 | 8.5 |
| 1-(12) | 1.26 | 0.48 | 3 | 63 | 9.0 |

What is claimed is:

1. A pleated nonwoven filter fabric for making into pleated filters comprising a plurality of sheath-core conjugate filaments in which the filament core component is made of a polymer higher in melting point than the sheath component and the sheath component is made of a polymer lower in melting point than the core component, wherein the surfaces of the nonwoven fabric have a plurality of compressively bonded dented portions at dotted locations, and the fabric weight per unit area X (g/m$^2$) of the nonwoven fabric, measured according to the method of JIS L 1906, and the stiffness Y (mgf), measured according to the Gurley method of JIS L 1096, satisfy the following formulae:

$$Y/X^2 \geq 0.03$$

$$X \geq 120.$$

2. A pleated nonwoven filter fabric for pleated filters, according to claim 1, wherein the average depth of said dent portions formed, measured according to JIS B 0601, is 60 μm or less.

3. A pleated nonwoven filter fabric for pleated filters, according to claim 1, wherein the apparent density of the compressively bonded portions is 0.6 g/cm$^3$ or more, and the fabric also includes non-compressively bonded portions, and wherein the apparent density of the non-compressively bonded portions is less than 0.6 g/cm$^3$.

4. A pleated nonwoven filter fabric for pleated filters, according to claim 1, wherein the total area of the compressively bonded portions comprises 5 to 35% of the entire area of the nonwoven fabric.

5. A pleated nonwoven filter fabric for pleated filters, according to claim 1, wherein the core component is polyethylene terephthalate, and the sheath component is a copolymerized polyester having a melting point lower than that of the core component by 20° C. or more.

6. A pleated nonwoven filter fabric for pleated filters, according to claim 1, wherein the sheath component accounts for 5 to 40 wt % of the sheath-core continuous filaments.

7. A pleated nonwoven filter fabric for pleated filters, according to claim 1, wherein the fiber fineness of the sheath-core continuous filaments is 1 to 10 denier.

8. A pleated nonwoven filter fabric for pleated filters, according to claim 1, wherein the core component contains electrically conductive particles.

9. A pleated nonwoven filter fabric for pleated filters, according to claim 8, wherein the electrically conductive particles are carbon black.

10. A pleated filter nonwoven fabric for pleated filters, according to claim 8 or 9, wherein the quantity of the nonwoven fabric which contains electrically conductive particles, measured according to the method C of JIS L 1094, is less than 10 μC/m$^2$.

11. A pleated filter element, formed of a nonwoven filter fabric for pleated filters, said fabric being defined in claim 1.

* * * * *

UNITED STATES PATENT AND TRADEMARK OFFICE
CERTIFICATE OF CORRECTION

PATENT NO.    : 6,485,811 B1
DATED         : November 26, 2003
INVENTOR(S)   : Horiguchi et al.

It is certified that error appears in the above-identified patent and that said Letters Patent is hereby corrected as shown below:

Column 2,
Line 27, please insert -- DISCLOSURE OF THE INVENTION -- before the paragraph beginning with "An embodiment".

Column 8,
Line 25, please change "mm" to -- $mm^+$ --.

Column 12,
Line 59, please change "filter nonwoven" to -- nonwoven filter --.

Signed and Sealed this

Sixth Day of January, 2004

JAMES E. ROGAN
*Director of the United States Patent and Trademark Office*

UNITED STATES PATENT AND TRADEMARK OFFICE
CERTIFICATE OF CORRECTION

PATENT NO.    : 6,485,811 B1
DATED         : November 26, 2003
INVENTOR(S)   : Horiguchi et al.

It is certified that error appears in the above-identified patent and that said Letters Patent is hereby corrected as shown below:

Column 2,
Line 27, please insert -- DISCLOSURE OF THE INVENTION -- before the paragraph beginning with "An embodiment".

Column 8,
Line 25, please change "mm" to -- $mm^+$ --.

Column 12,
Line 59, please change "filter nonwoven" to -- nonwoven filter --.

This certificate supersedes Certificate of Correction issued January 6, 2004.

Signed and Sealed this

Second Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,485,811 B1                                                                 Page 1 of 1
DATED        : November 26, 2003
INVENTOR(S)  : Horiguchi et al.

It is certified that error appears in the above-identified patent and that said Letters Patent is hereby corrected as shown below:

Column 2,
Line 27, please insert -- DISCLOSURE OF THE INVENTION -- before the paragraph beginning with "An embodiment".

Column 8,
Line 25, please change "mm" to -- mm$^2$ --.

Column 12,
Line 59, please change "filter nonwoven" to -- nonwoven filter --.

This certificate supersedes Certificate of Correction issued March 2, 2004.

Signed and Sealed this

First Day of June, 2004

JON W. DUDAS
*Acting Director of the United States Patent and Trademark Office*